United States Patent [19]
Sobeck et al.

[11] Patent Number: 5,519,588
[45] Date of Patent: May 21, 1996

[54] TAIL LIGHT ASSEMBLY

[75] Inventors: Earl R. Sobeck, Dearborn Heights; Robert B. Georgeff, Pleasant Ridge, both of Mich.

[73] Assignee: Chrysler Corporation, Auburn Hills, Mich.

[21] Appl. No.: 305,541

[22] Filed: Sep. 14, 1994

[51] Int. Cl.⁶ ........................................... B60Q 1/26
[52] U.S. Cl. .................. 362/61; 362/80; 362/240; 362/241; 362/304; 362/347; 362/305
[58] Field of Search ................. 362/61, 80, 297, 362/304, 305, 346, 347, 237, 240, 241, 244, 245, 249, 252, 72, 348, 350, 309, 327

[56] References Cited

U.S. PATENT DOCUMENTS

| | | | |
|---|---|---|---|
| 1,732,165 | 10/1929 | Kelly | 362/240 |
| 1,981,450 | 11/1934 | Fenna | 362/240 |
| 2,673,288 | 3/1954 | Stevens et al. | 362/61 X |
| 4,680,680 | 7/1987 | Iwaki et al. | 362/61 X |
| 4,831,503 | 5/1989 | DeSantis et al. | 362/240 X |
| 4,843,522 | 6/1989 | Rosenberg | 362/61 |
| 5,093,768 | 3/1992 | Ohe | 362/241 |

*Primary Examiner*—Denise L. Gromada
*Assistant Examiner*—Thomas M. Sember
*Attorney, Agent, or Firm*—Edward A. Craig

[57] ABSTRACT

A tail light assembly for an automotive vehicle has a housing provided with a back panel and a translucent cover secured to and cooperating with the back panel in defining a tail light chamber. A row of light bulbs is mounted in the chamber in spaced apart relation. A reflector is secured to the back panel behind the light bulbs. The reflector is of the Fresnel-type having annular reflector segments encircling each bulb and shaped to reflect the rays of light from the bulbs along substantially parallel paths. The reflector is in the form of a substantially flat plate having an edge along the row of light bulbs which is substantially straight or only slightly curved and visually perceptible through the translucent cover when the light bulbs are illuminated. Electrical circuitry for the light bulbs is disposed within the housing sandwiched between the back panel of the housing and the reflector plate. Preferably, the circuitry is disposed in a recess in the back panel.

3 Claims, 3 Drawing Sheets

TAIL LIGHT ASSEMBLY

FIELD OF THE INVENTION

This invention relates to a tail light assembly for motor vehicles.

BACKGROUND AND SUMMARY OF THE INVENTION

It is standard practice to use parabolic reflectors in the tail lights of motor vehicles. Parabolic reflectors columnate the light, that is, they reflect the light rays along parallel paths so that a column of light emanates from the light source.

Parabolic reflectors are generally cup-shaped in configuration. When parabolic reflectors are employed in tail light assemblies, particularly a tail light assembly having a row of spaced apart light bulbs, a curved or scalloped shadow effect is visually perceptible along the edge of the reflector, which is undesirable from the standpoint of appearance.

One object of this invention is to provide a tail light assembly in which the reflector is substantially flat rather than cup-shaped or parabolic and is formed in a manner which avoids the undesirable curved or scalloped effect.

In the tail light assembly of this invention, the standard parabolic reflector is replaced by a Fresnel-type reflector. A Fresnel-type reflector is formed with annular reflector segments encircling each light bulb. These segments match corresponding portions of a standard parabolic reflector but are telescoped to make them roughly co-planar so that the overall reflector configuration is generally flat except for the segmented reflecting surface. The reflector has an edge which is preferably straight or at most only slightly curved running along the row of light bulbs, thus avoiding the scalloped effect. Preferably, the circuitry for the light bulbs is disposed within the tail light housing sandwiched between the back wall of the tail light housing and the reflector. As such, the circuitry is well protected from weather and the elements.

Another object is to provide a tail light assembly having the foregoing features.

Other objects are to provide a tail light assembly which is formed of a relatively few simple parts, is rugged and durable in use, and relatively inexpensive and easy to manufacture and assemble.

Other objects, features and advantages of the invention will become more apparent as the following description proceeds, especially when considered with the accompanying claims and drawings.

DETAILED DESCRIPTION OF A PREFERRED EMBODIMENT

Figure 1:
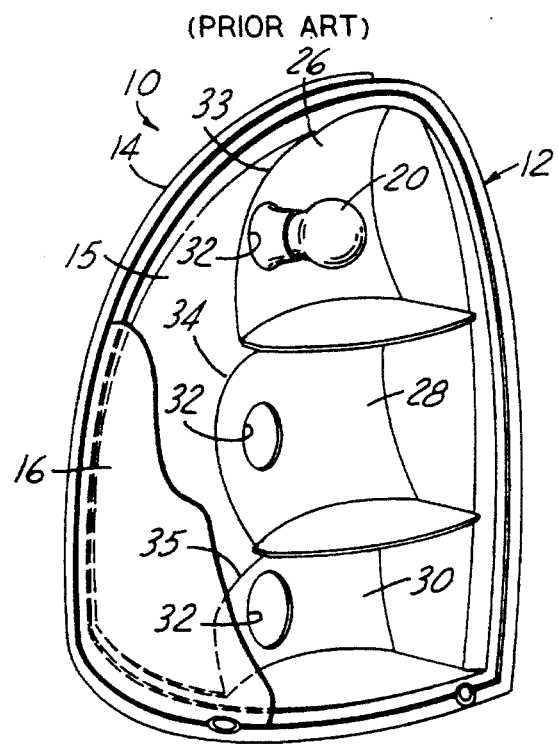
FIG. 1 is a perspective view of a prior art tail light assembly with two of the three light bulbs removed for clarity and with the translucent cover partially broken away.
Figure 2:
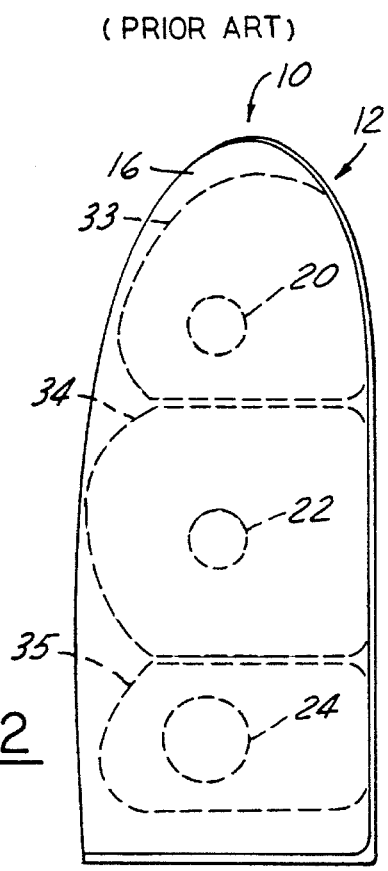
FIG. 2 is a view in elevation of the prior art tail light assembly of FIG. 1 as seen from the rear of a vehicle on which the tail light assembly is mounted, and with the translucent cover in place.
Figure 3:
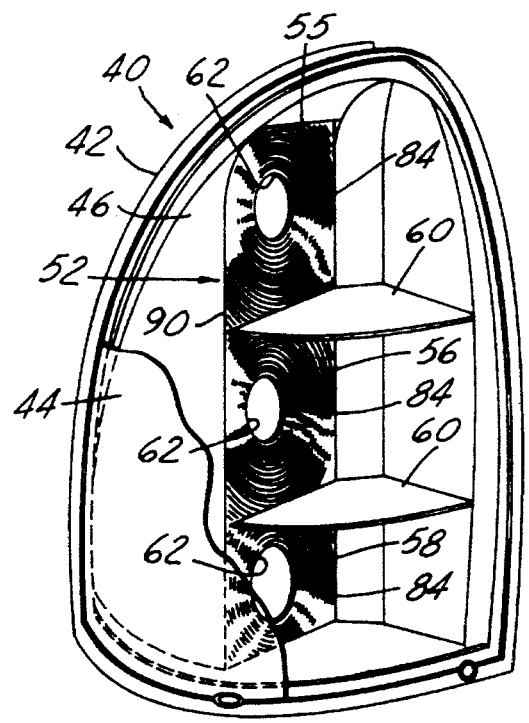
FIG. 3 is a perspective view of a tail light assembly constructed in accordance with this invention, with all of the three light bulbs removed for clarity and with the translucent cover partially broken away.
Figure 4:
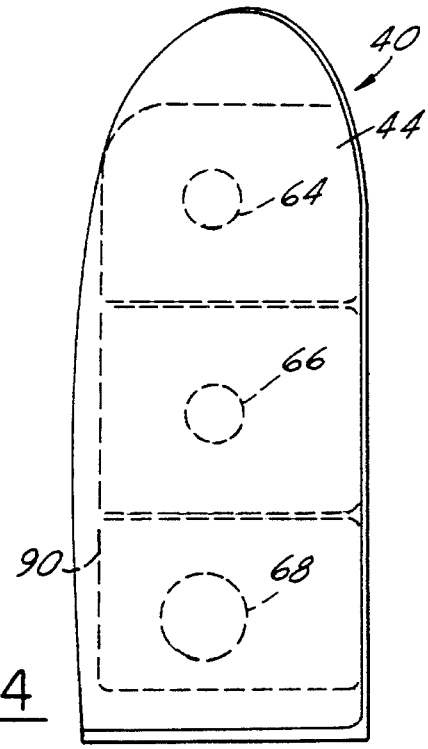
FIG. 4 is a view of the tail light assembly of FIG. 3 as viewed from the rear of a vehicle on which the tail light assembly is mounted, and with the translucent cover in place.
Figure 5:
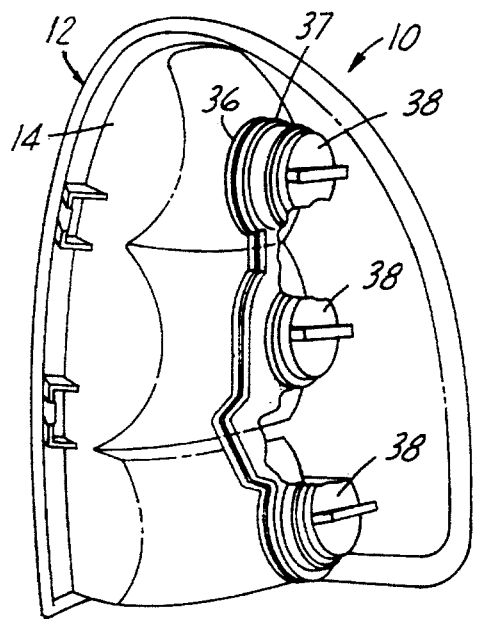
FIG. 5 is a perspective view of the prior art tail light assembly of FIGS. 1 and 2 showing the back of the assembly, that is, the side which faces forwardly when the tail light assembly is mounted on the vehicle.
Figure 6:
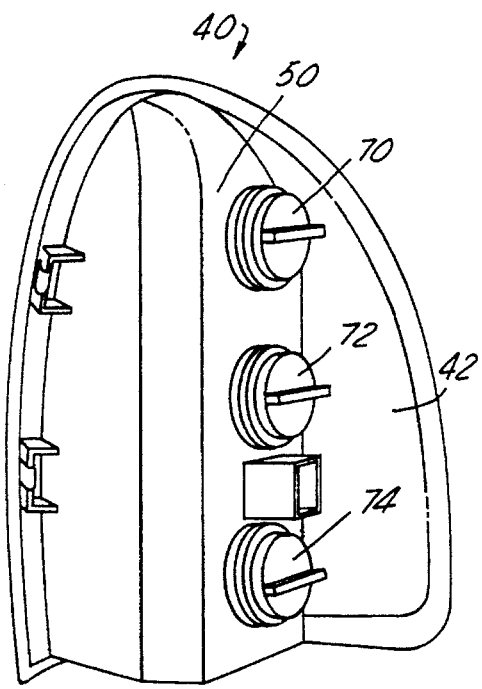
FIG. 6 is a perspective view of the tail light assembly of FIGS. 3 and 4 showing the back of the assembly, that is, the side which faces forwardly when the tail light assembly is mounted on the vehicle.
Figure 7:
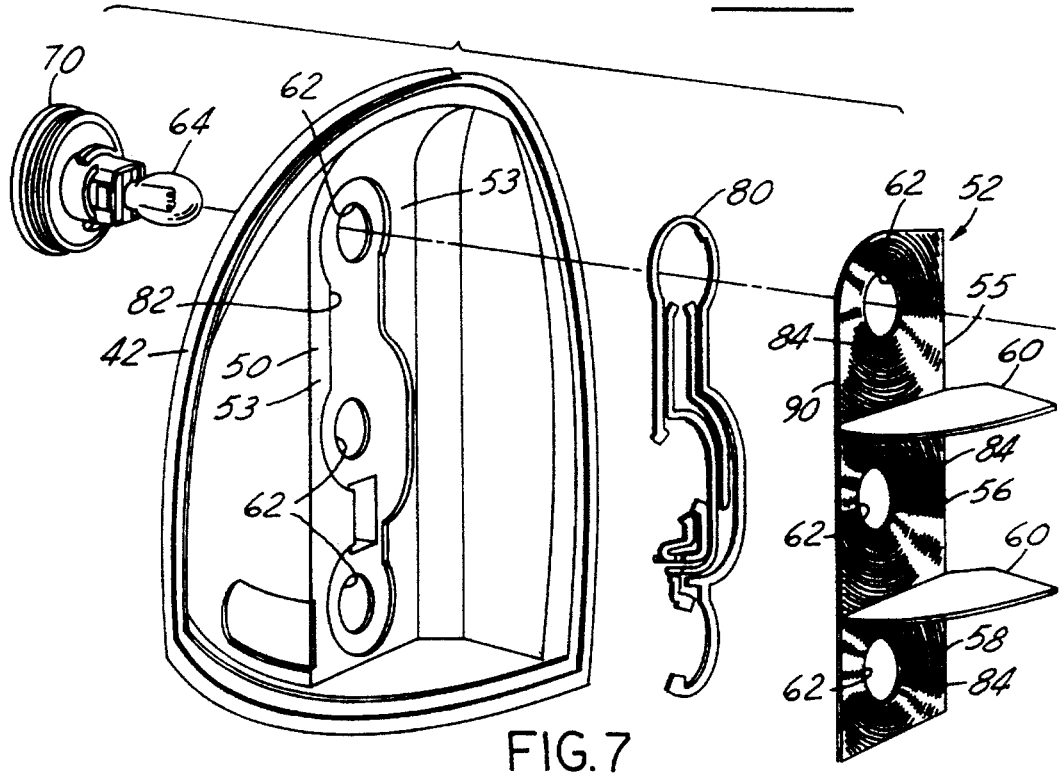
FIG. 7 is an exploded view in perspective of the tail light assembly of FIGS. 3 and 4 showing the back panel of the tail light housing, one of the light bulbs, the circuitry for the light bulbs, and the reflector plate.
Figure 8:
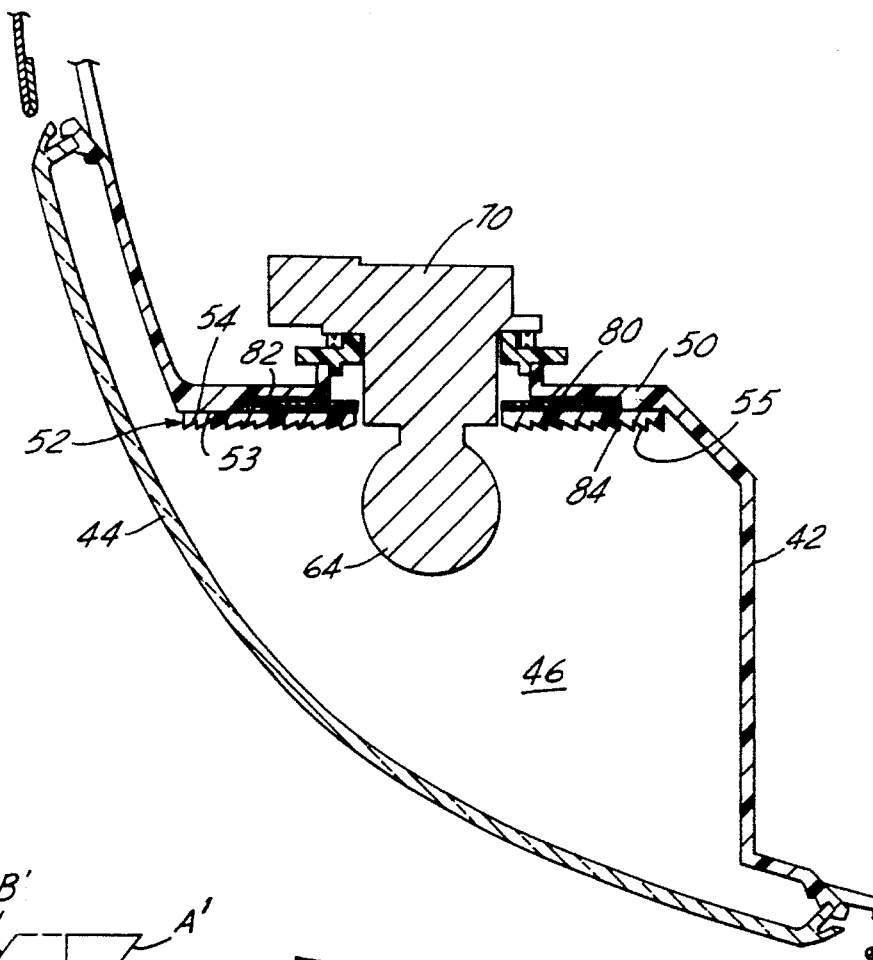
FIG. 8 is a sectional view through the tail light assembly showing one of the light bulbs mounted in position within the housing, and also showing the circuitry for the light bulbs sandwiched between the back wall of the housing and the reflector plate.

Referring now more particularly to the drawings, and especially FIGS. 1, 2 and 5, a prior art tail light assembly 10 is shown comprising a housing 12 having a back panel 14 and a translucent cover 16. The back panel and cover are secured together at their peripheries and cooperate in defining a chamber 15 for tail light bulbs 20, 22 and 24. The back panel is shaped to provide a vertical row of parabolic reflectors 26, 28 and 30. The reflectors are concave or cup-shaped and each has a hole 32 in the base through which one of the light bulbs projects. The parabolic reflectors columnate the light from the three bulbs, that is, they direct the rays of light from the bulbs along parallel, generally horizontal paths. Because the reflectors are parabolic or cup-shaped, they have connecting curved edges 33,34 and 35. These curved edges create a scalloped appearance as readily seen in FIG. 2. This scalloped appearance is visually perceptible through the translucent cover when the tail light assembly is viewed from the rear of the car and is considered unattractive in appearance and therefore objectionable. Circuitry (not shown) for the light bulbs is outside the housing, clamped between mounting strips 36 and 37 secured to the back panel 14. Light bulb retainers 38 are secured to mounting strip 37.

Referring now to FIGS. 3, 4 and 6–9, the tail light assembly of this invention will be seen to comprise a housing 40 having a slightly dished back panel 42 and a slightly dished translucent cover 44. The back panel and cover are generally triangular in configuration and are secured together at their peripheries by any suitable means to provide a sealed tail light chamber 46.

The back panel 42 has a vertically elongated flat central portion 50. Secured to the central section 50 by any suitable means inside the chamber 46 is a vertically elongated substantially flat reflector plate 52. The reflector plate 52 may be made of any highly reflective material such as a suitable plastic. The confronting surfaces 53 and 54 of the central section 50 and of the reflector plate 52 are flat and are in surface-to-surface contact with one another.

The reflector plate 52 is preferably of one-piece integral construction and has three reflector sections referred to herein as reflectors, namely, a top reflector 55, an intermediate reflector 56 and a bottom reflector 58. The reflectors 55–58 are preferably separated by horizontal partitions 60 which project rearwardly from the reflector plate.

The reflectors 55–58 are substantially identical. Each has a hole 62 at the center through which a light bulb projects. There are three such light bulbs 64, 66 and 68. One such light bulb may, for example, be a traditional night light which is illuminated when the head lights are turned on, another may be operated by a turn signal, and the third may be a back-up light. The light bulbs are carried by light bulb retainers 70, 72 and 74 mounted on the outer side of the central section 50 of the back panel. The bulbs project through the respective holes 62 and point toward the translucent cover 44, which is toward the rear when the tail light assembly is mounted on the rear of a motor vehicle. A flat circuit panel or circuitry 80 is disposed in a recess 82 on the surface 53 of the central section 50 of the back panel and is sandwiched between the surface 53 of the central section 50 of the back panel and the surface 54 of the reflector plate 52. The circuitry connects the light bulbs to the battery of the automobile to illuminate the bulbs.

Figure 9:
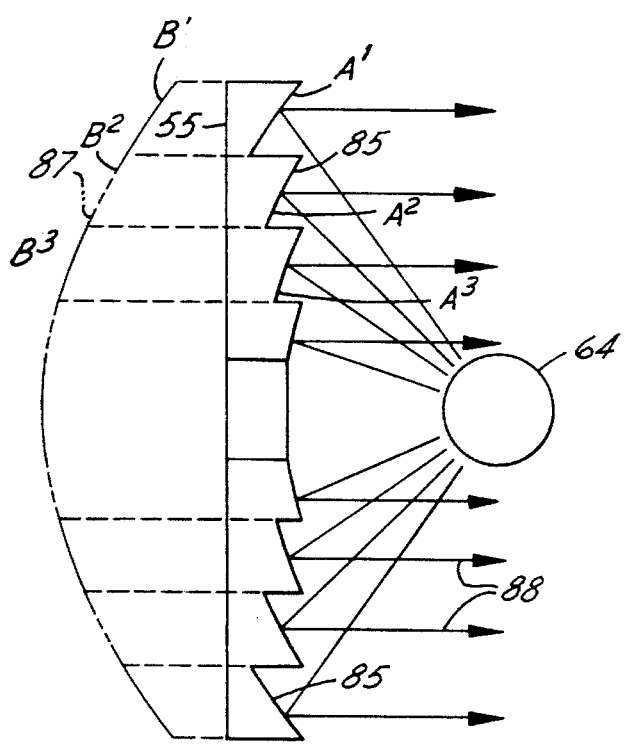
FIG. 9 is an enlarged sectional view of the reflector plate showing the reflector segments as having the same configuration as corresponding surfaces on a parabolic figure, but telescoped or compacted so as to be substantially co-planar.

Each reflector 55, 56, 58 is generally flat except for its reflecting surface 84 which is a so-called Fresnel-type reflecting surface. This Fresnel-type reflecting surface is formed by annular or circular reflector segments 85 encircling each light bulb. In FIG. 9, the reflecting surface is shown enlarged adjacent to the outline of a parabolic curve 87 and it will be noted that the curvature of each individual reflector segment $A^1$, $A^2$, $A^3$ etc. conforms to the curvature of a corresponding portion $B^1$, $B^2$, $B^3$ etc. of the parabolic curve. In effect, the Fresnel-type reflecting surface takes the curved portions of the parabola and telescopes them so that they are roughly co-planar. The rays of light 88 from each light bulb are thus columnated by the associated reflector to concentrate the reflected rays into a column of light projecting along parallel paths in a horizontal direction.

The side edge 90 of the reflector plate is preferably straight as shown, except near the top where a smooth curve is indicated across the upper end of the reflector plate. An important feature is that this side edge 90 does not have the objectionable scalloped appearance of prior art tail light assemblies equipped with parabolic reflectors. Rather it has a smooth outline which is straight or at least substantially straight. Actually the side edge 90 could have a smooth, slightly curved outline and still be considered substantially straight, as long as it does not have the scalloped configuration of prior tail light assemblies. The shadowy outline of the side edge 90 can be visually perceived through the translucent cover but is pleasing in appearance and hence not objectionable.

The circuitry 80 is placed in the sealed chamber 46 within the housing where it is protected from the weather. This is made possible because the surfaces of the central section 50 of the back panel and of the reflector plate 52 are flat so that the circuitry 80 can be sandwiched between such surfaces inside the housing. The circuitry of prior art tail light assemblies had to be on the outside because of the parabolic shape of the reflectors.

What is claimed is:

1. A tail light assembly for an automotive vehicle comprising:

a tail light housing, said housing having a back panel, a translucent cover secured to and cooperating with said back panel in defining a tail light chamber, a row of light bulbs mounted in said chamber in spaced apart relation, and a Fresnel-type reflector in said chamber secured to said back panel behind each light bulb, each reflector having annular reflector segments encircling one of the bulbs, said reflector segments being shaped to reflect the rays of light from the bulbs along substantially parallel paths, wherein said reflectors are integrally joined in juxtaposed, edge-to-edge relation to form an elongated substantially flat reflector plate of one-piece construction, said reflectors having side margins cooperating to form a continuous edge along substantially the full length of said reflector plate which is substantially straight and is visually perceptible through the translucent cover when the light bulbs are illuminated, said reflector segments being disposed in substantially a common plane and extending at different angles to one another.

2. A tail light assembly for an automotive vehicle comprising:

a tail light housing, said housing having a back panel, a translucent cover secured to and cooperating with said back panel in defining a tail light chamber, a row of light bulbs mounted in said chamber in spaced apart relation, and a Fresnel-type reflector in said chamber secured to said back panel behind each light bulb, each reflector having annular reflector segments encircling one of the bulbs, said reflector segments being shaped to reflect the rays of light from the bulbs along substantially parallel paths, wherein said reflectors are integrally joined to form a substantially flat reflector plate having an edge along the row of light bulbs which is substantially straight or at most only slightly curved and is visually perceptible through the translucent cover when the light bulbs are illuminated, said reflector segments being disposed in substantially a common plane and extending at different angles to one another, wherein said back panel has a first surface inside said chamber facing said cover, said reflector plate has a second surface overlying said first surface, and electrical circuitry for supplying current to said light bulbs sandwiched between said surfaces, wherein said surfaces are substantially flat, one of said surfaces is formed with a recess, said circuitry is disposed in said recess, and said surfaces are in direct surface-to-surface contact with one another.

3. A tail light assembly for an automotive vehicle comprising:

a tail light housing, said housing having a back panel, a translucent cover secured to and cooperating with said back panel in defining a tail light chamber, a row of light bulbs mounted in said chamber in spaced apart relation, and a Fresnel-type reflector in said chamber secured to said back panel behind each light bulb, each reflector having annular reflector segments encircling one of the bulbs, said reflector segments being shaped to reflect the rays of light from the bulbs along substantially parallel paths, wherein said reflectors are integrally joined to for a substantially flat reflector plate having an edge along the row of light bulbs which is substantially straight or at most only slightly curved and is visually perceptible through the translucent cover when the light bulbs are illuminated, said reflector segments being disposed in substantially a common plane and extending at different angles to one another, wherein said back panel has a first surface inside said chamber facing said cover, said reflector plate has a second surface overlying said first surface, and electrical circuitry for supplying current to said light bulbs sandwiched between said surfaces, wherein said surfaces are substantially flat, said first surface is formed with a recess, said circuitry is disposed in said recess, and said surfaces are in direct surface-to-surface contact with one another.

\* \* \* \* \*